United States Patent Office 2,880,545
Patented Apr. 7, 1959

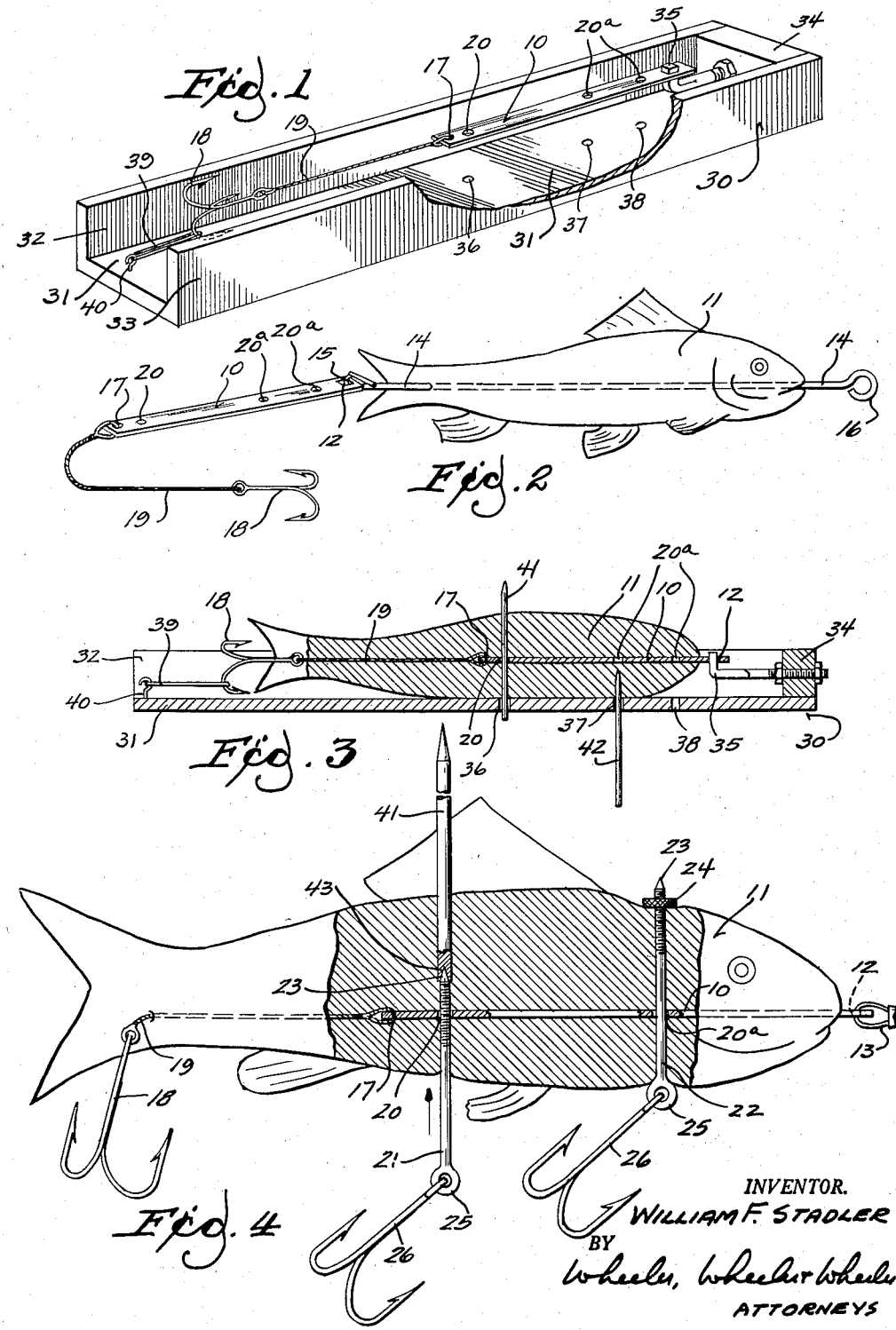

2,880,545

FISH LURE EQUIPMENT

William F. Stadler, Milwaukee, Wis.

Application April 23, 1956, Serial No. 579,853

2 Claims. (Cl. 43—4)

My invention relates to improvements in fish lure equipment.

A natural lure such as the body of a fish, minnow, or other aquatic living thing provides an attractive bait for fishing, provided it can be equipped with a suitable leader, hooks and, as I have discovered, a stiffening member to prevent the forward part of the bait from bending when the game fish strikes the lure. Furthermore, my equipment makes it possible to apply triple hooks to the forward part of a natural bait body. This last feature is especially important where an undersized game fish strikes the lure and in the absence of some device equivalent to a triple hook secured to the lure may swallow the bait sufficiently so that the removal of the bait from the fish's mouth will kill the fish and prevent its survival when thrown back into the lake.

Generally stated, it is an object of my invention to provide fish lure equipment including a stiffening device to be extended substantially through the longitudinal dimension of the bait and at the same time provide means for attaching hooks and leader to the bait while preserving the natural appearance thereof.

Another object of the invention is to provide equipment to convert a natural bait body into a complete lure with facility and means including a template and holder to facilitate positive attachment of fish lure appurtenances.

In the drawings:

Fig. 1 is a perspective view of a trough-like holder for a natural minnow bait, a side wall of the holder being broken away to exhibit lure accessories and a template to facilitate installation of the accessories with respect to a natural bait.

Fig. 2 shows a side elevation of a natural bait, and my lure accessory in position for assembly with the natural bait—showing the use of a skewer tool for carrying out the assembly operation.

Fig. 3 is a longitudinal vertical section through the holder and assembled bait and lure accessory; the template portions of my holder being exhibited in a partially completed transverse skewer assembly operation.

Fig. 4 is a side elevation of a natural bait and my lure accessories, a portion of the natural bait and portions of the accessories being shown in vertical section to disclose the final step in my method of assembly of transversely skewered accessories.

To convert a natural bait such as a fish, minnow, or other aquatic living thing into an effective fishing lure, it has heretofore been necessary to tear the exterior of the body or otherwise mutilate it so that its natural appearance has been seriously detracted from. Furthermore, the security with which hooks and other fish lure equipment could be attached to a natural bait body has been substantially limited. It will be noted from the following description that the parts of my fish lure equipment when attached and placed in position upon a natural bait body add a certain degree of stability to the forward parts of the body but preserve natural flexibility of the rearward parts thereof and minimize the required mutilation of the exterior.

The principal structural member of my fish lure equipment is a skewer-like element which I shall denominate the longitudinal skewer member. It is shown at 10 in the drawings and is preferably a metallic or plastic bar, strip, or rod sufficiently long to extend down through the gullet and through the forward part of the middle longitudinal portion of the bait body 11 as shown in the drawings. Here the bait body appears as a minnow or natural small fish, although it will be understood that a frog, or almost any natural bait may be used.

The forward end of the longitudinal skewer member is apertured at 12 so that a leader attachment 13 may be engaged with the forward end of the assembled bait lure.

To insert the longitudinal skewer into the natural bait, I provide an elongated latch needle 14 shown in Fig. 2. This has a latch equipped hook 15 at one end and handle or eye 16 at the other end. A standard latch needle for a knitting machine may be provided with an elongated shank and will perform the function now to be described.

The user of my lure and attachments will use the elongated needle as a skewer to be projected through the mouth, gullet and viscera of the natural bait as shown in Fig. 2. The hook 15 is then exposed sufficiently to be received through the opening 12. The latch may then be closed and the longitudinal skewer is drawn into and through the bait body to the position shown in Fig. 3.

It will then slightly project from the mouth of the bait. At the rearward end of the longitudinal skewer member there is an opening through the skewer member at 17 for attachment of any form of trailing hook or lure apparatus 18 including a flexible wirelike member 19 which will not appreciably stiffen the natural bait.

Intermediate the ends of the longitudinal skewer member 10, I provide openings 20 and 20a so that side lure members may be attached to the bait body. For this purpose, lure equipment mounts 21 and 22 comprise transverse skewers of a length approximately adequate to penetrate laterally through the bait body as shown. These mounts are somewhat pointed at 23 and are provided with a nut-like stop 24 adjustably receivable upon the pointed end of the mount. I have shown the stops 24 in threaded engagement with the end portions of the mounts, but it will be apparent that any form of positive attachment and adjustment of the stop upon the mount may be provided. At the other end of the mount is an eye 25 to which lure equipment such as the triple hook 26 may be secured.

To facilitate the placement of the transverse skewers 21 and 22, I provide a template box 30 which is provided with a box bottom 31, side walls 32 and 33 respectively and an end wall 34. In this trough-like box, the natural bait 11 with the longitudinal skewer member 10 in position as shown in Fig. 3 may be so laid that the longitudinal skewer member 10 is "hooked" upon an aligning hook 35. Reference has already been made to the fact that the opening 12 at one end of the longitudinal skewer member may be used in the final assembly of my lure for attachment to a connection 13. I form the oepning 12 with a square configuration, and I also form the hook 35 in such configuration as to be received snugly in the square opening 12, thus aligning and positioning the longitudinal skewer member with reference to bores 36, 37, and 38 through the bottom 31 of the box template 30.

When the natural bait 11 upon the longitudinal skewer member 10 is in the position shown in Fig. 3, the rearmost portion of the natural bait is maintained in outstretched position by means of an elastic tensioning member 39 engaged with hook 18 and also engaged in tension with hook 40 secured to the rearmost portion of the center of the bottom 31 of the box template. Skewer tools 41 and 42 are then receivable, as shown in Fig. 3, through the bore 36 and one of the selected bores 37 or 38 so as to be projectable transversely through the bait body and through openings 20 and 20a of the longitudinal skewer member.

As shown in Fig. 4, the skewer tools have socket ends opposite their pointed ends and when the skewer tools are placed in the position shown with respect to skewer tool 41 in Fig. 3, the bait and partially assembled lure may be removed from the box template 30 in readiness for insertion and assembly of the transverse skewer equipment mounts 21 and 22. The assembly and insertion of these skewer mounts is shown with respect to skewer mount 21 in Fig. 4 where it will be seen that the pointed end of the skewer mount has been inserted in the socketed end 43 of skewer tool 41 and with sufficient pressure upon the skewer mount 21, the skewer tool has been thrust through the bait body whereby to act as a guide for the skewer mount as it passes through the bait body and through the appropriate opening in the longitudinal skewer member 10. When a skewer mount has been placed in position as shown at 22 in Fig. 4, stop 24 is threaded upon the skewer mount to permanently assemble it with reference to the natural bait.

The skewer tools 41 and 42 and the template box 30 with its elastic member 39 may then be laid aside for subsequent use.

From the above description, it will be obvious that the longitudinal skewer member lends a considerable element of stiffness to the forward part of the bait body, but the flexible wire 19 permits of natural flexing of the rearward portion. Furthermore, my fish lure equipment assures that the bait body is sufficiently reinforced not only by the longitudinal skewer member but also by such transverse skewers as may be used with stops as described, and no opportunity to tear the hooks 26 or other lure equipment from the bait body is possible with the transverse and longitudinal skewer members so securely incorporated with the bait body.

I have provided more than one opening 20a toward the forward end of the longitudinal skewer member 10 so as to make it possible for the adaptation of a single skewer of this kind to bait boxes of differing lengths. The user may select template box bore 37 or 38 for insertion of skewer tool 42 and thus leave more or less of the longitudinal skewer member projecting forwardly from the mouth of the natural bait.

Reviewing categorically the steps to be followed in assemblying a natural bait and the various accessories described above, the first step involves the insertion of the latch needle 14 and its hook 15 through the mouth of the natural bait body 11. The latch and its hook are forced through the tail portion of the bait sufficiently, as shown in Fig. 2, so that the longitudinal skewer member 10 can be hooked onto the hook 15.

The next step is the actual hooking of the hook 15 through the square opening 12 in the forward end of the longitudinal skewer member. Then the needle 14 is drawn through the natural bait body so as to pull the longitudinal skewer member to the position shown in Fig. 3. This also pulls the flexible wirelike member 19 into the position shown in Fig. 3 with the trailing hook 18 properly positioned at the tail of the bait.

The next step comprises the placing of the bait in the trough of the box template 30 and the placement of the aligning hook 35 through the square opening 12 of the longitudinal skewer member. This assures that the opening 20a and the opening 20 will be aligned with their respective template openings in the bottom of the template box.

The trailing hook 18 is then engaged with the elastic member 39 to place the entire lure in tension and in alignment longitudinally in the box.

The next step is the insertion through the bottom of the box template of the skewer tools 41 and 42, and they are forced through the bait box as well as through the proper openings in the longitudinal skewer member. When this operation is complete, the skewer tools are projecting only slightly below the bottom of the template box 30 and the points of the skewer tools are projecting through the top of the bait box as viewed in Fig. 3.

The bait body is now ready for removal from the template box. This is accomplished by lifting the longitudinal skewer member from its position of engagement with aligning hook 35 and the disengagement of trailing hook 18 from the elastic tensioning member 39.

When the bait body is removed from the template box 30, the exposed ends of the skewer tools 41 and 42 are available for use in guiding equipment mounts 21 and 22 through the bait body and through the openings in the longitudinal skewer member 10. This is accomplished as shown in Fig. 4 where it will be seen that the tip of the equipment mount 21 has been inserted in the socketed end of the skewer tool at 43. Pressure upon the equipment mount 21 to force the skewer tool through the bait enables the operator to use the skewer tool as a guide and the equipment mount may be thrust completely "home" as shown at the right in Fig. 4 where it will be seen that the equipment mount 22 has assumed its ultimate position for use.

The final step in the process involves the placing of stops 24 in position upon the equipment mounts. In this illustration, the stops are in threaded engagement with the equipment mounts although, of course, other means such as special clips or pins may be used for this purpose.

I claim:

1. A box template shaped for reception of a natural bait, said template having a tension member at one end and a directionally stable hooklike member at the other end, a longitudinal skewer member having a fish lure accessory attached at one end in position for engagement with the tension member and an aperturre at the other end shaped to engage the directionally stable hooklike member whereby to align the skewer relative to the box template, said template and said longitudinal skewer member having bores in position to be aligned for insertion of transverse skewer tools when the longitudinal skewer is engaged with the hooklike member.

2. A template having a directionally stable member adjacent one end thereof, said template being shaped for application of a bait thereagainst, a longitudinal skewer member having a fish lure accessory attached at one end thereof for engagement with the directionally stable member, said template and said longitudinal skewer member having bores in position to be aligned for insertion of transverse skewer members when the longitudinal skewer is engaged with the directionally stable member, and a transverse skewer receivable through said bores.

References Cited in the file of this patent

UNITED STATES PATENTS

| 643,573 | Votaw et al. | Feb. 13, 1900 |
| 2,565,956 | Duhamel | Apr. 28, 1951 |

FOREIGN PATENTS

| 23,217 | Great Britain | Dec. 2, 1893 |
| 149,387 | Austria | Apr. 26, 1937 |
| 187,633 | Switzerland | Aug. 2, 1937 |
| 221,545 | Great Britain | June 4, 1923 |